(12) United States Patent
Murakami et al.

(10) Patent No.: US 9,013,585 B2
(45) Date of Patent: Apr. 21, 2015

(54) IMAGE CAPTURE DEVICE

(71) Applicant: Panasonic Corporation, Osaka (JP)

(72) Inventors: Masahiro Murakami, Kyoto (JP); Yuji Ueda, Osaka (JP); Takeyuki Hasegawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 86 days.

(21) Appl. No.: 14/033,665

(22) Filed: Sep. 23, 2013

(65) Prior Publication Data

US 2014/0204226 A1 Jul. 24, 2014

(30) Foreign Application Priority Data

Jan. 24, 2013 (JP) ................................. 2013-010994

(51) Int. Cl.
*H04N 5/232* (2006.01)

(52) U.S. Cl.
CPC ....... *H04N 5/23287* (2013.01); *H04N 5/23258* (2013.01); *H04N 5/23267* (2013.01)

(58) Field of Classification Search
CPC .......... H04N 5/23248; H04N 5/23258; H04N 5/23267; H04N 5/23274; H04N 5/23287
USPC ...................... 348/208.2, 208.3, 208.5, 208.6
See application file for complete search history.

(56) References Cited

U.S. PATENT DOCUMENTS

| | | | | |
|---|---|---|---|---|
| 5,794,078 | A * | 8/1998 | Okazaki | 396/55 |
| 6,965,397 | B1 * | 11/2005 | Honey et al. | 348/208.2 |
| 7,486,879 | B2 * | 2/2009 | Moriya et al. | 348/208.2 |
| 7,609,950 | B2 * | 10/2009 | Washisu | 348/208.2 |
| 7,899,313 | B2 * | 3/2011 | Uenaka | 348/208.2 |
| 7,903,960 | B2 * | 3/2011 | Uenaka | 348/208.2 |
| 7,903,961 | B2 * | 3/2011 | Uenaka | 348/208.2 |
| 7,962,021 | B2 * | 6/2011 | Uenaka | 348/208.2 |
| 8,553,095 | B2 * | 10/2013 | Lee | 348/208.2 |
| 8,736,690 | B2 * | 5/2014 | Imanishi | 348/208.2 |
| 8,743,219 | B1 * | 6/2014 | Bledsoe | 348/208.5 |
| 2008/0145041 | A1 * | 6/2008 | Enomoto | 396/53 |
| 2009/0245768 | A1 | 10/2009 | Uenaka | |
| 2009/0251551 | A1 * | 10/2009 | Uenaka | 348/208.4 |
| 2009/0315808 | A1 | 12/2009 | Ishii | |
| 2010/0177198 | A1 | 7/2010 | Hayashi et al. | |

(Continued)

FOREIGN PATENT DOCUMENTS

| | | | |
|---|---|---|---|
| JP | 2002-094877 A | | 3/2002 |
| JP | 2005003404 A | * | 1/2005 |
| JP | 2007064854 A | * | 3/2007 |

*Primary Examiner* — John Villecco
(74) *Attorney, Agent, or Firm* — Renner, Otto, Boisselle & Sklar, LLP (57) ABSTRACT

An exemplary image capture device 100 includes: an image capturing section 270 configured to generate an image based on a subject image formed; a first sensor 260 configured to detect acceleration of gravity on the device 100 itself to output a first detection signal; a second sensor 250 configured to detect a variation in the device's own attitude to output a second detection signal; and a processor 290 configured to calculate a first magnitude of correction based on a frequency component in the first detection signal, which is equal to or lower than a first frequency, configured to calculate a second magnitude of correction based on a frequency component in the second detection signal, which is equal to or higher than a second frequency, and configured to correct, based on the calculated first and second magnitudes of correction, tilt of at least one of the subject image and the image.

12 Claims, 8 Drawing Sheets

(56) References Cited

U.S. PATENT DOCUMENTS

| | | |
|---|---|---|
| 2010/0245604 A1 | 9/2010 | Ohmiya et al. |
| 2011/0063458 A1* | 3/2011 | Washisu et al. ............ 348/208.2 |
| 2012/0092511 A1* | 4/2012 | Wakamatsu ............... 348/208.2 |
| 2012/0268555 A1* | 10/2012 | Yamashita et al. ......... 348/208.2 |
| 2014/0063272 A1* | 3/2014 | Tsuchida et al. ........... 348/208.2 |
| 2014/0063276 A1* | 3/2014 | Tsuchida et al. ........... 348/208.6 |
| 2014/0063279 A1* | 3/2014 | Ogura et al. ............... 348/222.1 |
| 2014/0146205 A1* | 5/2014 | Xu et al. ....................... 348/239 |

* cited by examiner

IMAGE CAPTURE DEVICE

BACKGROUND

1. Technical Field

The present disclosure relates to an image capture device.

2. Description of the Related Art

Japanese Laid-Open Patent Publication No. 2002-94877 discloses an electronic camera, which writes, on a storage medium, image data representing an image that has been cropped out of an image obtained by capturing (which will be sometimes referred to herein as a "captured image"). This electronic camera makes a correction on an image by rotating the coordinates of an image area to be cropped out of a captured image in such a direction as to cancel the tilt of the image. To correct the tilt of an image through such processing will be referred to herein as either a "tilt correction" or a "rotational correction".

SUMMARY

One non-limiting, and exemplary embodiment provides provides an image capture device which can make a rotational correction more appropriately.

In one general aspect, an image capture device herein includes: an image capturing section configured to generate an image based on a subject image that has been formed; a first sensor configured to detect acceleration of gravity on the image capture device itself and configured to output a result of the detection as a first detection signal; a second sensor configured to detect a variation in the image capture device's own attitude and configured to output a result of the detection as a second detection signal; and a processor configured to calculate a first magnitude of correction based on a frequency component that is included in the first detection signal and that is equal to or lower than a first predetermined frequency, configured to calculate a second magnitude of correction based on a frequency component that is included in the second detection signal and that is equal to or higher than a second predetermined frequency, and configured to correct, based on the calculated first and second magnitudes of correction, tilt of at least one of the subject image and the image.

According to the technique of the present disclosure, an image with tilt can be subjected to a rotational correction more appropriately.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

Embodiment 1

Hereinafter, a first embodiment in which the technique of the present disclosure is applied to a digital camcorder will be described with reference to the accompanying drawings. In the following description, a signal or data representing an image will be sometimes simply referred to herein as an "image". Also, the direction of the acceleration of gravity will be sometimes referred to herein as "perpendicular direction" or "vertical direction" and the direction that intersects with that vertical direction at right angles as "horizontal direction", respectively.

1-1. Outline

Figure 1:
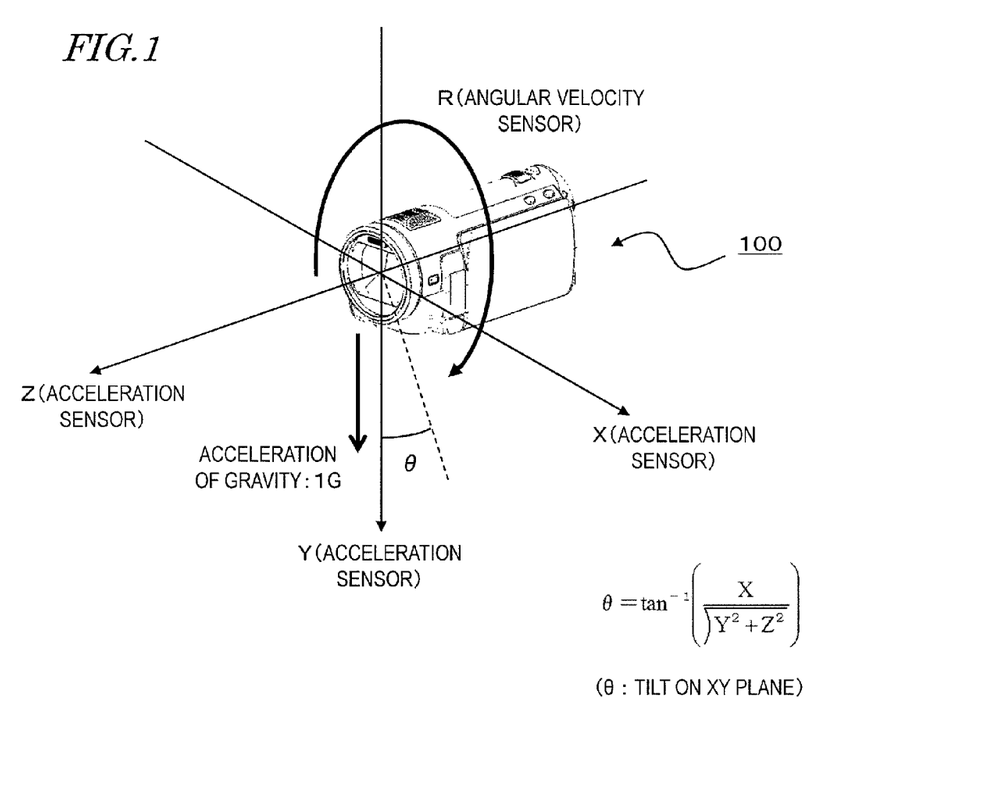
FIG. 1 illustrates the appearance of a digital camcorder 100 with the axes of detection of an acceleration sensor and an angular velocity sensor.

FIG. 1 illustrates the appearance of a digital camcorder 100.

The digital camcorder 100 of this embodiment can make a correction on the "tilt" or "rotation" of an image shot to be caused by the "rotation" of the digital camcorder 100 on a plane which intersects with the optical axis at right angles (i.e., the XY plane shown in FIG. 1). In this case, the "rotation" includes "static rotation" and "dynamic rotation".

The "static rotation" refers herein to the tilt of the digital camcorder 100 with respect to the horizontal direction when the digital camcorder 100 is fixed, for example.

On the other hand, the "dynamic rotation" refers herein to the rotation of the digital camcorder 100 around the optical axis on a plane that intersects with the optical axis at right angles due to the tremor of the hands of a shooter who is holding this digital camcorder 100. Such a dynamic rotation is mainly comprised of frequency components of 3 Hz or more. In this description, a rotation around the optical axis will be sometimes referred to herein as a "rotation in the rolling direction".

This digital camcorder 100 includes an angular velocity sensor which detects the angular velocity in the rolling direction and an acceleration sensor which detects the tilt of the device's own housing with respect to the horizontal direction. And the digital camcorder 100 makes a correction on the "static rotation" and "dynamic rotation" based on the respective outputs of the angular velocity sensor and the acceleration sensor.

In this case, the digital camcorder 100 sets a part of the frequency range of the detection signal of the angular velocity sensor which covers frequencies for detecting the angular velocity and a part of the frequency range of the detection signal of the acceleration sensor which covers frequencies for detecting the acceleration to be different from each other. More specifically, the digital camcorder 100 uses a relatively high frequency range for the detection signal of the angular velocity sensor and a relatively low frequency range for the detection signal of the acceleration sensor. As a result, the angle of rotation can be calculated more appropriately by taking advantage of the properties of both the angular velocity sensor and acceleration sensor.

And using the angle of rotation of the housing that has been calculated, the digital camcorder 100 rotates the coordinates of an image area to be cropped out of the image shot in such a direction as to cancel the tilt of the image shot. In this manner, an image with tilt can be subjected to the rotation correction processing more appropriately.

It should be noted that this digital camcorder 100 can shoot both a still picture and a moving picture alike. And the "image" is a generic term which refers herein to both of them. A moving picture is made up of a number of image frames. Thus, each of those image frames just needs to be subjected to the rotation correction processing as disclosed in this description.

Hereinafter, it will be described with reference to the accompanying drawings exactly what configuration this digital camcorder 100 has and specifically how this camcorder 100 operates.

1-2. Configuration of Digital Camcorder 100

A configuration for the digital camcorder 100 of this embodiment will now be described with reference to FIG. 2.

Figure 2:
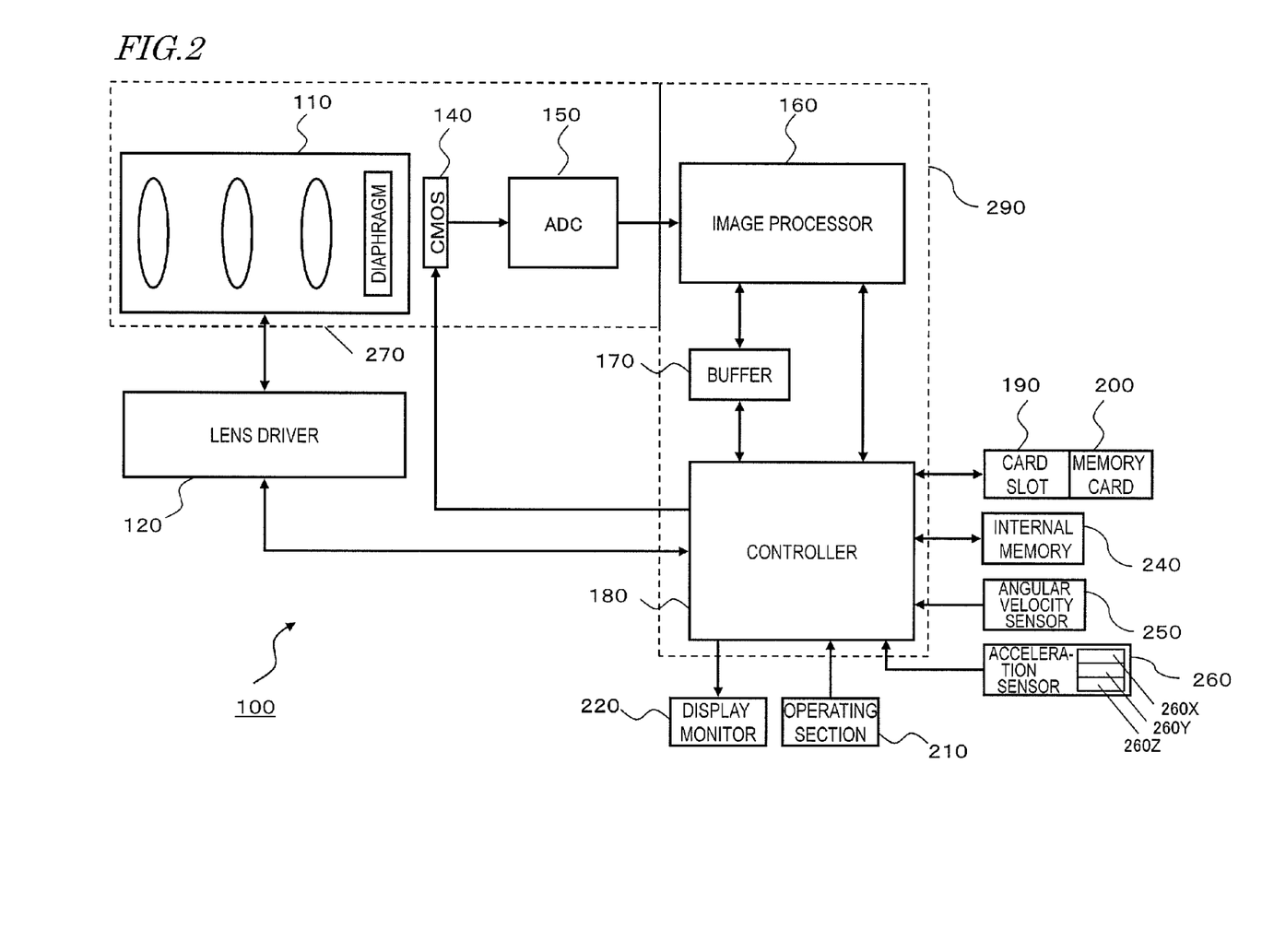
FIG. 2 is a block diagram illustrating a configuration for the digital camcorder 100 which corrects the tilt of an image.

FIG. 2 is a block diagram illustrating a configuration for the digital camcorder 100 and illustrates how respective components of this digital camcorder 100 are electrically connected together.

This digital camcorder 100 includes an image capturing section 270, an image processor 160, a buffer 170, a controller 180, a card slot 190, a memory card 200, an operating section 210, a display monitor 220, an internal memory 240, an angular velocity sensor 250, and an acceleration sensor 260.

The image capturing section 270 generates an image based on a subject image that has been formed and includes an optical system 110, a lens driver 120, a CMOS image sensor 140 and an A/D converter (ADC) 150.

The digital camcorder 100 gets a subject image that has been formed through the optical system 110 converted into an electrical signal by the CMOS image sensor 140 (i.e., captured). The image processor 160 subjects the electrical signal generated by the CMOS image sensor 140 to various kinds of processing and then stores it on the memory card 200.

Hereinafter, these components of this digital camcorder 100 will be described in further detail. After that, it will be described how this digital camcorder 100 operates.

The optical system 110 includes a single or multiple lenses, a diaphragm, and other optical elements.

The optical system 110 may include only a single lens but is supposed to include multiple lenses in this embodiment. Examples of those multiple lenses include a zoom lens, an optical image stabilizer (OIS) lens, and a focus lens. By moving the zoom lens along the optical axis, the subject image formed on the image capturing plane of the CMOS image sensor 140 can be either zoomed in on or zoomed out. Also, by moving the focus lens along the optical axis, the focus of the subject image can be adjusted. The OIS lens is movable within a plane that crosses the optical axis of the optical system 110 at right angles. By shifting the OIS lens in such a direction as to cancel the shake of the digital camcorder 100, the influence of the shake of the digital camcorder 100 on the captured image can be reduced. Even though three lenses corresponding to those three types are illustrated in FIG. 2, this is only an example and any other number of lenses may be used instead. The number and kind of lenses to use may be determined appropriately according to the functions and performance required.

The diaphragm adjusts the size of the aperture, through which the light passes, either in accordance with the user's setting or automatically in response to a control signal supplied from the controller 180 (to be described later), thereby controlling the quantity of light transmitted through the aperture.

Optionally, the optical system 110 may further include a zoom actuator which drives the zoom lens, an OIS actuator which drives the OIS lens, a focus actuator which drives the focus lens, and a diaphragm actuator which drives the diaphragm. None of those additional actuators are shown in FIG. 2.

The lens driver 120 drives these various kinds of lenses and diaphragm included in the optical system 110. For example, the lens driver 120 controls the zoom actuator, focus actuator, OIS actuator and diaphragm actuator which may be included in the optical system 110.

The CMOS image sensor 140 converts the subject image that has been formed by the optical system 110 into an electrical signal, thereby generating an analog image signal. The CMOS image sensor 140 performs various kinds of operations including exposure, transfer and electronic shuttering. Optionally, the CMOS image sensor 140 may be replaced with any other kind of image sensor such as a CCD image sensor or an NMOS image sensor.

The A/D converter 150 is a circuit which converts the analog image signal that has been generated by the CMOS image sensor 140 into digital image data. The output of the A/D converter 150 is passed to the image processor 160.

The image processor 160 is a circuit which performs various kinds of processing on the captured image data that has been provided by the A/D converter 150. The image processor 160 may be implemented as a digital signal processor (DSP) or a microcontroller (microprocessor), for example. The image processor 160 generates image data to be displayed on the display monitor 220 or image data to be stored on the memory card 200. For example, the image processor 160 performs gamma correction, white balance correction, flaw correction and various other kinds of processing. Also, the image processor 160 compresses the image data that has been supplied from the CMOS image sensor 140 via the ADC 150 compliant with a predetermined standard such as the H.264 standard or the MPEG-2 standard.

The image processor 160 subjects the image data to coordinate rotation processing. The coordinates are rotated in the direction in which the influence of the rolling direction to be caused to the image formed on the CMOS image sensor 140 by the device's own tilt or shake can be reduced. The image processor 160 gets information about the rotation correction angle from the controller 180 and rotates the coordinates of the image data by the angle indicated by that information.

The controller 180 is a processor which controls the overall operation of this digital camcorder. The controller 180 may be implemented as a semiconductor device or a semiconductor integrated circuit such as a microprocessor, for example. In one embodiment, the controller 180 may be implemented as combination of a central processing unit (CPU) and a program (software). Alternatively, the controller 180 may also be implemented as only a set of dedicated hardware components.

In FIG. 2, the image processor 160 and the controller 180 are illustrated as two separate components. However, the image processor 160 and the controller 180 may also be implemented as a single physically combined integrated circuit. That is to say, the image processor 160 and the controller 180 do not have to be implemented on two different semiconductor chips but may also form a single semiconductor chip as well. Such an integrated circuit or semiconductor chip is sometimes called an "integrated processor". In FIG. 2, such an integrated processor 290 is illustrated. In the processor 290, the image processor 160 is implemented as an image processing core and the controller 180 is implemented as a processor core. Although the processor 290 includes the buffer 170, this is only an example. The buffer 170 may be omitted as well.

The buffer 170 functions as a work memory for the image processor 160 and the controller 180 and may be implemented as a DRAM or a ferroelectric memory, for example.

The card slot 190 is an interface, to/from which the memory card 200 is readily insertable and removable, and can be connected to the memory card 200 both mechanically and electrically. The memory card 200 includes a flash memory, a ferroelectric memory or any other kind of internal memory, and can store image files and other data that have been generated by the image processor 160. It should be noted that the memory card 200 shown in FIG. 2 does not form part of the digital camcorder 100 but is an external component.

The internal memory 240 may be implemented as a flash memory or a ferroelectric memory, for example, and may store a control program for controlling the overall operation of this digital camcorder 100.

The operating section 210 is a generic term which collectively refers to various kinds of user interfaces through which the user can enter his or her instructions. The operating section 210 includes cross keys and an ENTER button which accept the user's instructions. Alternatively, the operating section 210 may also be implemented as a touch screen, which may be combined with the display monitor 220 to be described next. In that case, the touch screen and what is displayed on the display monitor 220 (such as icons representing buttons) may form the operating section 210 together.

The display monitor 220 may be implemented as an LCD panel or an OEL panel, for example. The display monitor 220 may display either an image represented by the image data that has been supplied from the image capturing section 270 and processed by the image processor 160 (i.e., a through-the-lens image) or an image represented by the image data that has been read out from the memory card 200. In addition, the display monitor 220 can also display various kinds of menus which allow the user to change various settings of this digital camcorder 100.

As described above, the digital camcorder 100 of this embodiment includes an angular velocity sensor 250 and an acceleration sensor 260. Hereinafter, the respective axes of detection of the angular velocity sensor 250 and the acceleration sensor 260 will be described with reference to FIG. 1 again as well as FIG. 2.

FIG. 1 schematically illustrates the axes of detection of the angular velocity sensor 250 and the acceleration sensor 260.

The angular velocity sensor 250 is a sensor which detects, as an angular velocity, a change in the attitude of the digital camcorder 100 (i.e., its own device) and which outputs a detection signal as a result of the detection. The angular velocity sensor 250 may be a vibrating gyrosensor, for example, which can detect the angular velocity by measuring the magnitude of displacement of a rotating vibrator being subjected to the Coriolis force. Optionally, an optical sensor or any other kind of sensor may also be used as the angular velocity sensor 250.

As shown in FIG. 1, the angular velocity sensor 250 of this embodiment detects the angular velocity of this digital camcorder 100 to be caused in the rolling (R) direction due to a camera shake, for example. The angular velocity sensor 250 may further include a sensor for detecting the angular velocity in the yaw direction (i.e., the direction of rotation around the Y-axis) and a sensor for detecting the angular velocity in the pitch direction (i.e., the direction of rotation around the X-axis), in addition to the sensor for detecting the angular velocity in the rolling direction.

By integrating the angular velocities to be obtained from the detection signals of the angular velocity sensor 250 (in the rolling direction) and transforming the integral into an angle, the controller 180 can calculate an angle of rotation (i.e., an angle of dynamic rotation) φ to cancel the shake of the digital camcorder 100 in the rolling direction during shooting.

The acceleration sensor 260 is a sensor which detects the tilt of this digital camcorder 100 with respect to the direction of the acceleration of gravity by sensing the acceleration of gravity applied to its own device and which outputs a detection signal as a result of the detection. As the acceleration sensor 260, a semiconductor acceleration sensor such as a capacitance coupled type, a piezoresistance type or a heat sensing type may be used, for example. However, the acceleration sensor 260 does not have to be such a semiconductor sensor, but may also be an optical or mechanical sensor as well.

As shown in FIG. 2, the acceleration sensor 260 of this embodiment includes three sensors. Specifically, the acceleration sensor 260 includes a sensor 260Z which detects an acceleration component in the optical axis direction (i.e., the Z-axis direction shown in FIG. 1) of this digital camcorder 100, a sensor 260X which detects an acceleration component within a plane that crosses the Z-axis at right angles and in the horizontal direction (i.e., X-axis direction) of this digital camcorder 100, and a sensor 260Y which detects an acceleration component within a plane that crosses the Z-axis at right angles and in the perpendicular direction (i.e., Y-axis direction shown in FIG. 1) of this digital camcorder 100. Each of these sensors outputs a detection signal in their associated axial direction.

In this description, these three sensors will be collectively referred to herein as an "acceleration sensor 260". Since the X-, Y- and Z-axes are fixed with respect to this digital camcorder 100, the acceleration components detected in these X-, Y- and Z-axis directions vary as this digital camcorder 100 changes its attitude.

Information about the acceleration which has been detected by the acceleration sensor 260 in the X-, Y- and Z-axis directions is provided as detection signals for the controller 180. By performing arithmetic processing on the respective detection signals in the X-, Y- and Z-axis directions of the acceleration sensor 260, the controller 180 can calculate the angle of rotation (i.e., the angle of static rotation) to make a correction on the rotation of the digital camcorder 100. In this case, if the respective values of the acceleration components that have been detected in the X-, Y- and Z-axis directions are indicated by X, Y and Z, respectively, the angle of rotation (i.e., the angle of static rotation) θ of this digital camcorder 100 with respect to the direction of the acceleration of gravity can be calculated by the following Equation (1):

$$\theta 1 = \tan^{-1}\left(\frac{X}{\sqrt{Y^2 + Z^2}}\right) \quad (1)$$

This angle θ can be said to be the tilt of the Y axis fixed on this digital camcorder 100 with respect to the perpendicular direction.

Figure 3A:
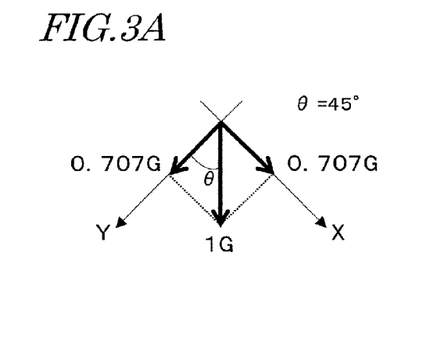
FIGS. 3A and 3B show how to calculate the angle θ of static rotation based on the acceleration values of respective components that have been detected by the acceleration sensor 260.
Figure 3B:
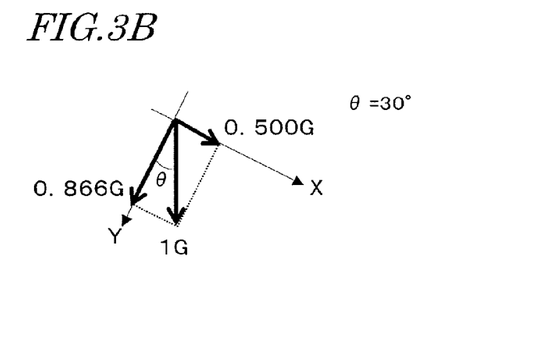

For example, suppose that if the magnitude of the acceleration of gravity is 1G (approximately 9.807 m/s$^2$), the acceleration values of the respective components that have been detected by the acceleration sensor 260 have turned out to be X=Y=0.707 G and Z=0 as shown in FIG. 3A, which represents a situation where this digital camcorder 100 is not tilted but in the rolling (R) direction. In that case, the controller 180 obtains θ=45 degrees as a result of calculation that has been made based on Equation (1). On the other hand, suppose that the acceleration values of the respective components that have been detected by the acceleration sensor 260 have turned out to be X=0.500 G, Y=0.866 G and Z=0 as shown in FIG. 3B. In that case, the controller 180 obtains θ=30 degrees as a result of calculation that has been made based on Equation (1). In any case other than these, the controller 180 can also calculate the tilt angle θ by Equation (1).

1-3. Operation of Digital Camcorder 100

Hereinafter, it will be described how this digital camcorder 100 operates.

Figure 4:
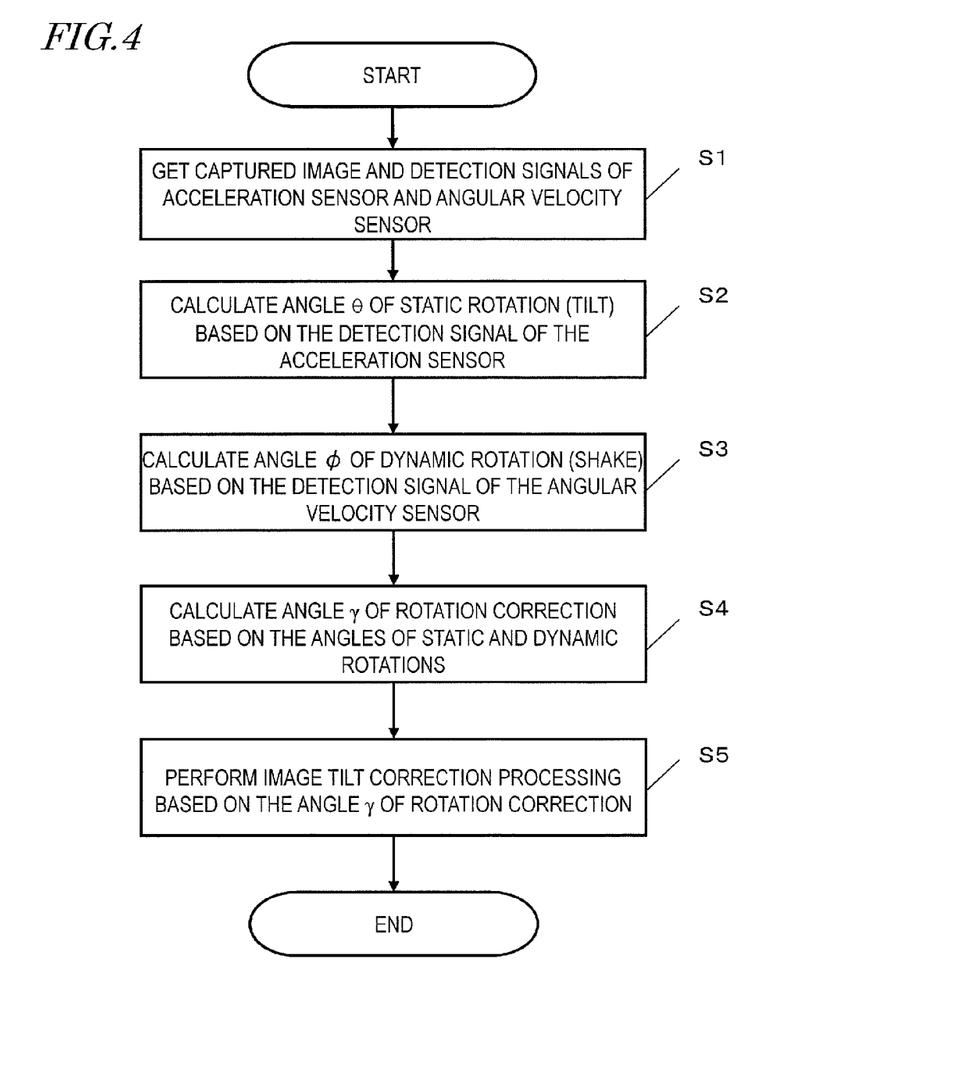
FIG. 4 is a flowchart showing the procedure of operation of this digital camcorder 100.

FIG. 4 is a flowchart showing the procedure of operation of this digital camcorder 100.

First, in Step S1, the image processor 160 of the digital camcorder 100 obtains a captured image. Meanwhile, the controller 180 gets the detection signals from the acceleration sensor 260 and the angular velocity sensor 250 as acceleration information and angular velocity information, respectively.

Next, in Step S2, the controller 180 calculates the angle θ of static rotation (i.e., tilt) based on the acceleration information.

Then, in Step S3, the controller 180 calculates the angle φ of dynamic rotation (i.e., camera shake) based on the angular velocity information.

Subsequently, in Step S4, the controller 180 calculates the angle γ of rotation correction based on the angle of static rotation θ and the angle of dynamic rotation φ.

Thereafter, in Step S5, the image processor 160 carries out image tilt correction processing using the angle γ of rotation correction.

Hereinafter, these processing steps S2 through S5 will be described more specifically with reference to FIG. 5 and other drawings.

Figure 5:
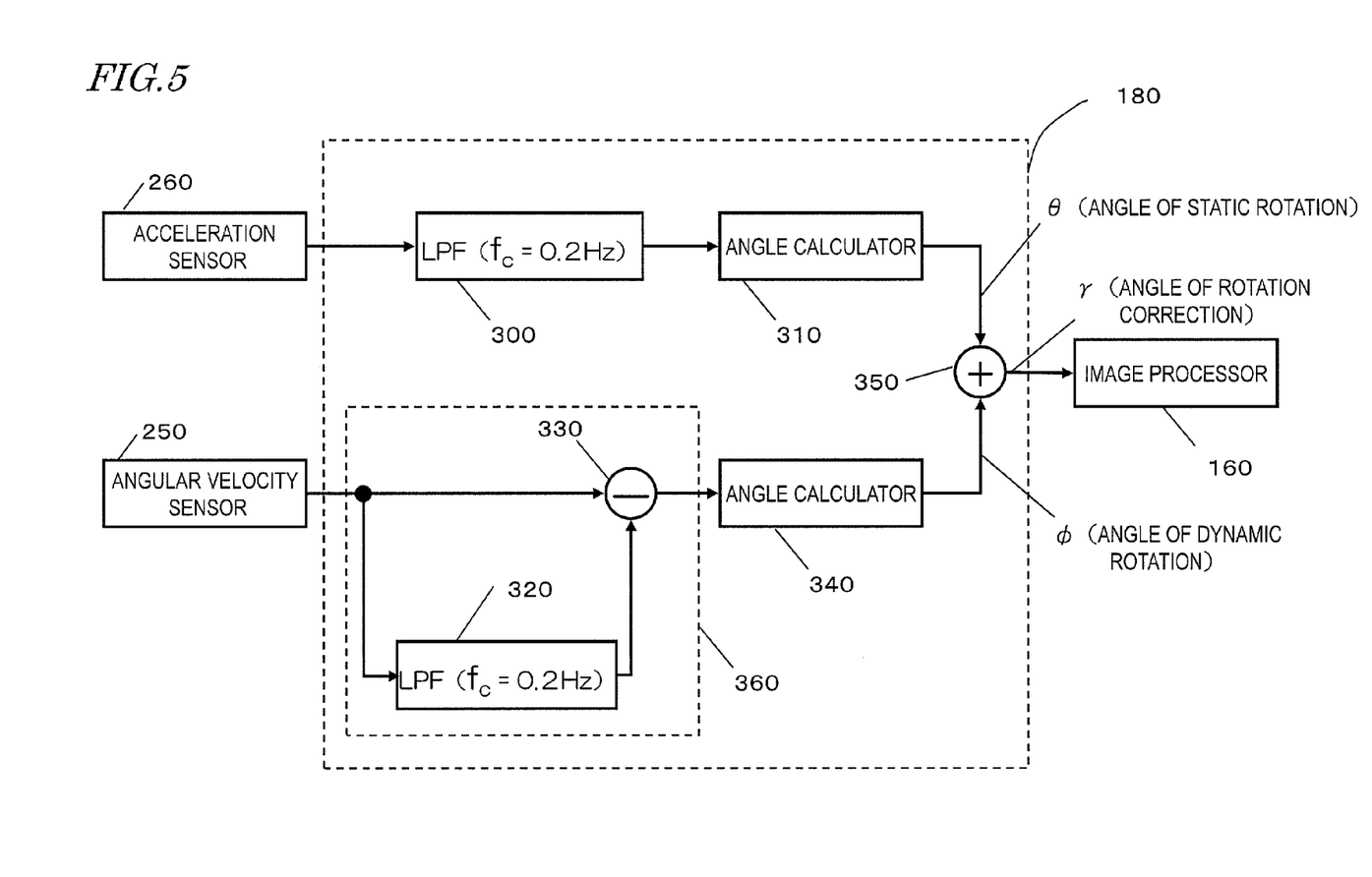
FIG. 5 illustrates a configuration for a part of the controller 180 which contributes to calculating the angle γ of rotation correction.

FIG. 5 illustrates a configuration for a part of the controller 180 which contributes to calculating the angle γ of rotation correction.

As shown in FIG. 5, the controller 180 includes a low-pass filter (LPF) 300, angle calculators 310, 340, an adder 350, and a high-pass filter (HPF) 360.

The functions of the blocks shown in FIG. 5 may be performed by making a CPU which is executing a software program operate as the LPF 300, the HPF 360, the angle calculators 310 and 340, and the adder 350 in accordance with the instructions described in the software program. If the controller 180 is carrying out digital processing, an A/D converter (not shown) may convert the analog output signals (detection signals) of the angular velocity sensor 250 and acceleration sensor 260 into digital signals.

1-3-1. How Controller 180 Calculates Angle θ of Static Rotation (Tilt)

The acceleration sensor 260 (consisting of the acceleration sensors 260X, 260Y and 260Z) outputs detection signals representing the acceleration as a result of the detection to the LPF 300. In response, the LPF 300 filters out noise from the detection signals supplied from the acceleration sensor 260.

The frequency characteristic of the LPF 300 will now be described.

The lower the cutoff frequency fc of the LPF 300 is set to be, the higher the detection accuracy of the acceleration sensor 260 can be. However, as the cutoff frequency fc is decreased, the responsivity indicating the time it takes to update the tilt correction on the captured image with the result of detection obtained by the acceleration sensor 260, i.e., the responsivity to the static rotation, deteriorates. On the other hand, if the cutoff frequency fc is increased, then the responsivity certainly improves but noise will be left in the detection signal. That is why if the cutoff frequency fc were set to be too high, the meaning of the LPF 300 would be lost.

Thus, according to this embodiment, the cutoff frequency fc is set to be 0.2 Hz to strike an adequate balance between noise reduction and responsivity to the static rotation.

However, the cutoff frequency fc does not have to be 0.2 Hz but may also be appropriately fine-tuned with the balance between noise reduction and responsivity to the static rotation taken into account.

Since the frequency of noise varies according to the property (or performance) of the acceleration sensor 260, the cutoff frequency fc may be determined by the performance of the acceleration sensor 260 to use.

The LPF 300 filters the detection signal supplied from the acceleration sensor 260 to extract a low frequency range (which will be sometimes referred to herein as "low-frequency components") from the detection signal. In this case, the "detection signal" collectively refers herein to the detection signals supplied from the three acceleration sensors 260X, 260Y and 260Z.

The LPF 300 outputs the low-frequency components to the angle calculator 310. In response, the angle calculator 310 uses the respective low-frequency components of the acceleration sensors 260X, 260Y and 260Z that have passed through the LPF 300 to calculate the angle θ (i.e., the angle of rotation that is regarded as a "static" one) by Equation (1).

The angle calculator 310 outputs the angle θ of static rotation thus calculated to the adder 350.

1-3-2. How Controller 180 Calculates Angle φ of Dynamic Rotation (Camera Shake)

Look at FIG. 5 again.

The angular velocity sensor 250 outputs a detection signal representing the angular velocity as a result of detection to the HPF 360.

The HPF 360 of this embodiment includes a low-pass filter (LPF) 320 and a subtractor 330.

In the HPF 360, the detection signal of the angular velocity sensor 250 is supplied to both the LPF 320 and the subtractor 330.

The LPF 320 extracts a low frequency range (which will also be referred to herein as "low-frequency components") from the output of the angular velocity sensor 250. And the subtractor 330 subtracts those low-frequency components that have passed through the LPF 320 from the detection signal of the angular velocity sensor 250. As a result, the subtractor 330 extracts a high frequency range (which will also be referred to herein as "high-frequency components") from the output of the angular velocity sensor 250.

In this embodiment, the cutoff frequency fc of the LPF 320 is set to be 0.2 Hz, which is as high as the cutoff frequency fc of the LPF 300 for the acceleration sensor. That is why the cutoff frequency fc of the HPF 360 also becomes 0.2 Hz.

By setting the cutoff frequency of the HPF 360 to be as high as that of the LPF 300 in this manner, it is possible to prevent the respective frequency ranges of the acceleration sensor 260 and the angular velocity sensor 250 from interfering with each other.

In addition, by setting their cutoff frequencies to be equal to each other, the timing when the output value of the angular velocity sensor 250 decreases can be adjusted to the response of the acceleration sensor 260 to the end of the rotation of the digital camcorder 100. As a result, the angle φ of rotation calculated based on the output of the angular velocity sensor 250 while the housing of the digital camcorder 100 is rotating dynamically and the angle θ of rotation of the housing of the digital camcorder 100 that has stopped can be linked with each other smoothly. By linking these two angles φ and θ of rotation smoothly with each other, rotation correction can always be made appropriately.

The result of calculation made by the subtractor 330 is supplied to the angle calculator 340. In response, the angle calculator 340 integrates together the angular velocities that have been calculated by the subtractor 330 and converts the integral into an angle. Then, the angle calculator 340 calculates the magnitude of rotational shake (i.e., the angle of rotation regarded as a dynamic one) φ and outputs the angle φ of dynamic rotation calculated to the adder 350.

In this manner, it is possible to prevent the frequency range of the angles calculated based on the outputs of the acceleration sensor 260 and the frequency range of the angles calculated based on the outputs of the angular velocity sensor 250 from interfering with each other, and calculate the respective angles of static rotation and dynamic rotation.

1-3-3. How Controller 180 Calculates Angle γ of Rotation Correction

The adder 350 adds together the angle θ of static rotation and the angle φ of dynamic rotation to calculate the angle γ of rotation correction in real time. That is to say, the angle γ of rotation correction indicates the tilt of the housing of the digital camcorder 100.

1-3-4. How Image Processor 160 Performs Tilt Correction Processing

The controller 180 outputs information about the angle γ of rotation correction calculated to the image processor 160. Based on the angle γ of rotation correction provided, the image processor 160 performs the processing of correcting the tilt of an image that has been captured by the CMOS image sensor 140.

Figure 6:
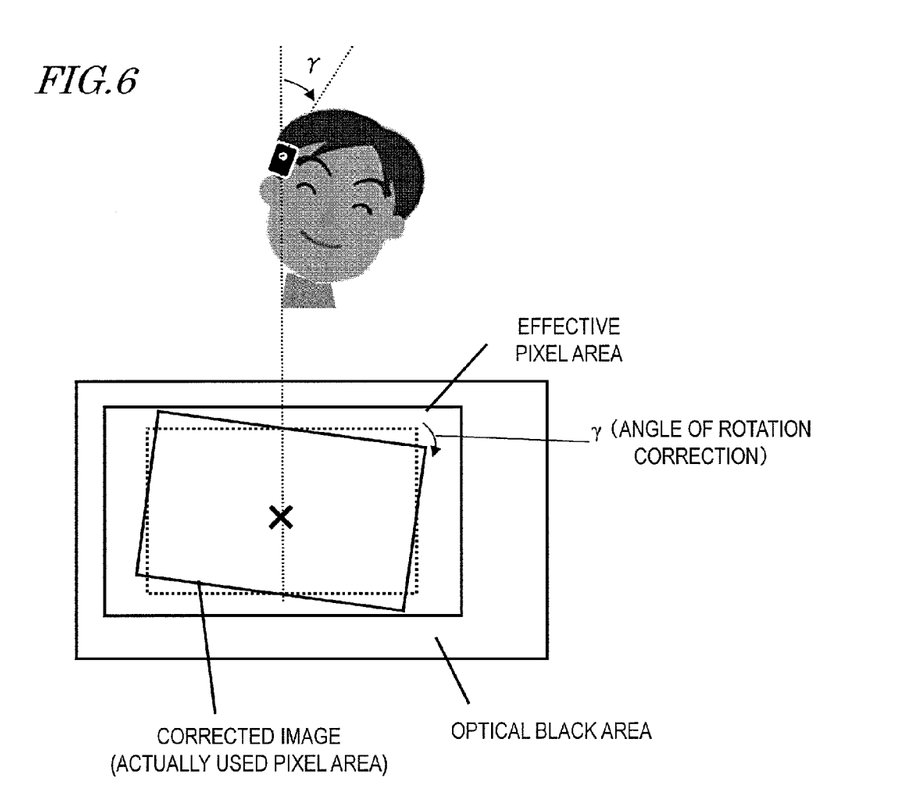
FIG. 6 schematically illustrates how to perform the tilt correction processing.

FIG. 6 schematically illustrates how to perform the processing of correcting the tilt of an image. In FIG. 6, illustrated is an example in which the digital camcorder 100 is used as a wearable camera that the user uses by wearing it on his or her face or clothes. In FIG. 6, illustrated are image areas corresponding to the optical black area, effective pixel area and actually used pixel area in the CMOS image sensor 140.

Suppose a situation where the digital camcorder 100 has rotated γ degrees counterclockwise due to the hand tremor of a person who is shooting a subject image or a situation where the shooter has shot the subject image with the digital camcorder 100 tilted γ degrees counterclockwise with respect to its reference position from the beginning (i.e., intentionally). That is to say, suppose the digital camcorder 100 is tilted γ degrees clockwise as shown in FIG. 6 when the shooter is viewed straight on. In each of these cases, a corrected image is generated by rotating the entire subject image γ degrees clockwise.

The image processor 160 rotates the image data in such a direction as to reduce the tilt of the image by reference to information about the angle γ of rotation correction that has been obtained from the controller 180. More specifically, the image processor 160 sets a new coordinate system in the image by rotating the coordinate system of the image data γ degrees clockwise. Thereafter, the image processor 160 performs the processing of cropping out an image portion in the new coordinate system and within the effective pixel area of the CMOS image sensor 140, and then outputs the cropped image portion (i.e., the image portion within the actually used pixel area as indicated by the solid rectangle) as a corrected image. In this manner, an image in which the tilt of the subject has been corrected can be obtained. And the image data of such an intended image including no pixels in the optical black area can be written on the memory card 200.

It should be noted that the sets of components shown in FIG. 2 are just an example and this digital camcorder 100 may also have any other configuration as long as the digital camcorder 100 can perform the operation to be described later. For example, some of the components shown in FIG. 2 may be omitted from this digital camcorder 100. Also, this digital camcorder 100 may further include a power supply, a storage device such as a hard disk drive, a flash, an external interface and any other additional components.

1-4. Detection Frequencies of Acceleration Sensor 260 and Angular Velocity Sensor 250

Hereinafter, the difference in detection frequency between the acceleration sensor 260 and the angular velocity sensor 250 will be described with reference to FIGS. 7A and 7B.

Figure 7A:
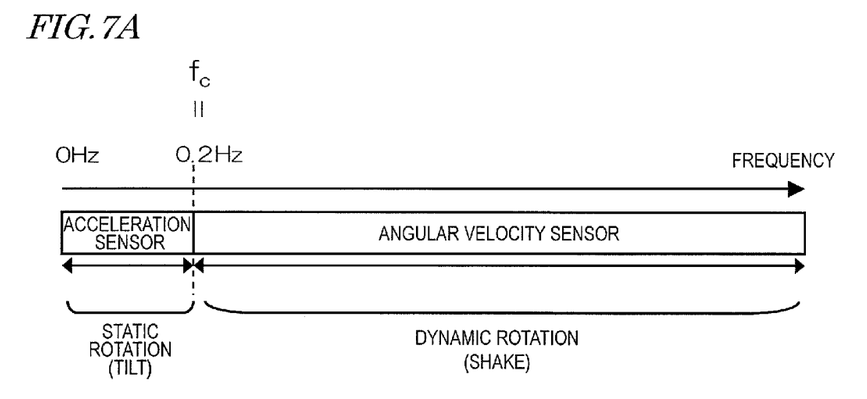
FIGS. 7A and 7B show a difference in detection frequency between the acceleration sensor and the angular velocity sensor.

FIG. 7A schematically illustrates a difference in detection frequency between the acceleration sensor 260 and the angular velocity sensor 250.

Suppose the respective cutoff frequencies fc of the LPFs 300 and 320 are both set to be 0.2 Hz as described above. In this embodiment, the angle θ of static rotation is obtained by using frequency components of the output detection signal of the acceleration sensor 260 which fall within the range of 0 to 0.2 Hz that is mostly regarded as representing static rotation (tilt). On the other hand, the angle φ of dynamic rotation is obtained by using frequency components of the output detection signal of the angular velocity sensor 250 which are higher than 0.2 Hz that is mostly regarded as representing dynamic rotation (camera shake).

Figure 7B:
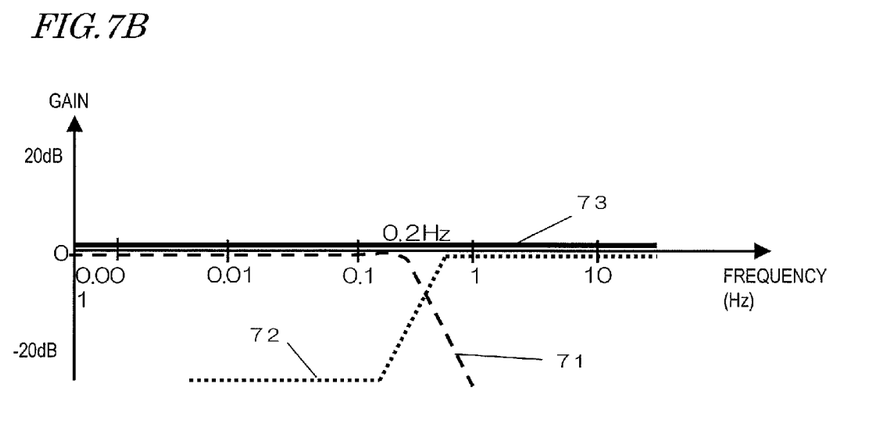

FIG. 7B is a gain diagram showing a difference in detection frequency between the acceleration sensor 260 and the angular velocity sensor 250.

In FIG. 7B, the gain characteristic 71 indicates how the gain to the output of the acceleration sensor (i.e., gain with respect to the static rotation) changes. The gain characteristic 72 indicates how the gain to the output of the angular velocity sensor (i.e., gain with respect to the dynamic rotation) changes. And the gain characteristic 73 indicates how the gain with respect to the dynamic and static rotations of the digital camcorder 100 (which will be sometimes referred to herein as "substantial rotation") changes.

In this embodiment, the respective cutoff frequencies fc of the LPFs 300 and 320 are both set to be 0.2 Hz. As shown in FIG. 7B, in the frequency range of less than 0.2 Hz, the gain to the output of the angular velocity sensor is kept low as indicated by the gain characteristic 72, while the gain to the output of the acceleration sensor remains approximately 0 dB as indicated by the gain characteristic 71. On the other hand, in the frequency range of 0.2 Hz or more, the gain to the output of the acceleration sensor is kept low as indicated by the gain characteristic 71, while the gain to the output of the angular velocity sensor remains approximately 0 dB as indicated by the gain characteristic 72. As a result, the detection frequencies of the acceleration sensor 260 and angular velocity sensor 250 can be separated from each other. Note that the respective cutoff frequencies fc of the LPFs 300 and 320 may vary slightly from each other because of the individual variability of the LPFs 300 and 320. In this disclosure, respective cutoff frequencies of the LPFs 300 and 320 may be set to be "substantially equal" to each other.

In this description, the gain characteristic of the low-pass filter 300 at and under the cutoff frequency of the low-pass filter 300 will be referred to herein as "low-frequency gain characteristic of the low-pass filter 300". On the other hand, the gain characteristic of the high-pass filter 360 at and over the cutoff frequency of the high-pass filter 360 will be referred to herein as "high-frequency gain characteristic of the high-pass filter 360". In this embodiment, the low-frequency gain characteristic of the low-pass filter 300 and the high-frequency gain characteristic of the high-pass filter 360 are supposed to have respectively constant values and be flat.

The digital camcorder 100 of this embodiment is designed so that the gain characteristic 73 with respect to the substantial rotation of the digital camcorder 100 becomes substantially flat at least over the frequency range in which the angular velocity sensor 250 and the acceleration sensor 260 operate. That is to say, the low-frequency gain characteristic of the low-pass filter 300 and the high-frequency gain characteristic of the high-pass filter 360 are designed so as to realize such a gain characteristic 73.

In this case, if the gain characteristic 73 is "substantially flat", then it means that in the gain diagram, not only the low-frequency gain characteristic of the low-pass filter 300 and the high-frequency gain characteristic of the high-pass filter 360 are flat but also their gains either agree with each other in a flat frequency range or just slightly disagree with each other but their difference does fall within a predetermined range. That is to say, even if their gains are different but if those gain characteristics are flat and their difference does fall within a predetermined range, the gain characteristic is "substantially flat". In this case, the "predetermined range" may be less than 3 dB, for example, and is suitably within the range of 0 to 1 dB. As a result, the angles φ and θ of rotation described above can be linked smoothly with each other.

In this embodiment, the low-frequency gain characteristic of the low-pass filter 300 and the high-frequency gain characteristic of the high-pass filter 360 are designed so that the gain characteristic 73 becomes substantially flat and that the gain becomes almost equal to 0 dB over the frequency range in which the angular velocity sensor 250 and the acceleration sensor 260 operate.

As an example in which the performance described above should be satisfied easily, the present inventors designed the HPF 360 including the LPF 320 with the same performance as the LPF 300 according to this embodiment.

As described above, the digital camcorder 100 of this embodiment includes: a CMOS image sensor 140 which generates an image by capturing a subject image; an acceleration sensor 260; an angular velocity sensor 250; a controller 180 which calculates a first magnitude of correction based on a frequency component that is included in the output of the acceleration sensor 260 and that is equal to or lower than a first frequency (of 0.2 Hz) and which also calculates a second magnitude of correction based on a frequency component that is included in the output of the angular velocity sensor 250 and that is higher than a second frequency (of 0.2 Hz); and an image processor 160 which corrects the tilt of the image that has been generated by the CMOS image sensor 140 based on the calculated first and second magnitudes of correction. As a result, the rotation correction can be made appropriately according to the respective characteristics of the acceleration sensor 260 and the angular velocity sensor 250.

1-5. Effects

As described above, an image capture device 100 according to this embodiment includes: an image capturing section 270 which generates an image based on a subject image that has been formed; an acceleration sensor 260 which detects acceleration of gravity on the device 100 itself and which outputs a result of the detection as a first detection signal; an angular velocity sensor 250 or angular acceleration sensor which detects a variation in the device's (100) own attitude and which outputs a result of the detection as a second detection signal; and a processor 290 which calculates a first magnitude of correction based on a frequency component that is included in the first detection signal and that is equal to or lower than a first predetermined frequency, which calculates a second magnitude of correction based on a frequency component that is included in the second detection signal and that is equal to or higher than a second predetermined frequency, and which corrects the tilt of at least one of the subject image and the image based on the calculated first and second magnitudes of correction.

With such an image capture device, either an image shot with tilt or an image on the image sensor (CMOS image sensor 140) yet to be shot can be subjected to a rotational correction more appropriately.

The processor 290 calculates the first magnitude of correction based on a part of the frequency component of the first detection signal that has passed through a low-pass filter 300, of which the cutoff frequency is defined by the first frequency, and calculates the second magnitude of correction based on a part of the frequency component of the second detection signal that has passed through a high-pass filter 360, of which the cutoff frequency is defined by the second frequency.

The gain characteristic of the low-pass filter 300 with respect to frequencies that are equal to or lower than its own cutoff frequency and the gain characteristic of the high-pass filter 360 with respect to frequencies that are equal to or higher than its own cutoff frequency fall within a predetermined range.

The gain characteristic of the low-pass filter 300 with respect to the frequencies that are equal to or lower than its own cutoff frequency and the gain characteristic of the high-pass filter 360 with respect to the frequencies that are equal to or higher than its own cutoff frequency are substantially flat.

The respective cutoff frequencies of the low-pass filter 300 and the high-pass filter 360 are equal to each other.

The high-pass filter 360 includes a filter 320 having the same frequency characteristic and same gain characteristic as the low-pass filter 300 and a subtractor 330. The filter 320 filters the second detection signal to pass low-frequency components of the second detection signal. The subtractor 330 subtracts the signal that has been filtered by the filter from the second detection signal and outputs high-frequency components of the second detection signal.

The processor 290 includes an image processor 160 which corrects the tilt of the image that has been generated by the image capturing section 270 based on a first magnitude of correction that has been calculated using frequency components of the first detection signal that are equal to or lower than a first predetermined frequency and on a second magnitude of correction that has been calculated using frequency components of the second detection signal that are equal to or higher than a second predetermined frequency.

The processor 290 includes: a controller 180 which calculates a first magnitude of correction based on frequency components of the first detection signal that are equal to or lower than a first predetermined frequency and calculates a second magnitude of correction based on frequency components of the second detection signal that are equal to or higher than a second predetermined frequency; and an image processor 160 which corrects, based on the first and second magnitudes of correction, the tilt of the image that has been generated by the image capturing section.

The image capturing section 270 includes an image sensor 140 which forms the subject image. The image capture device 100 further includes a driving mechanism 280 which changes the angle of the image sensor 140. The driving mechanism 280 includes: an actuator 280a which changes the angle of the image sensor 140; and a controller 280b which controls the actuator so that the actuator changes the angle of the image sensor 140 in accordance with an instruction given by the processor 290. The processor 290 instructs the driving mechanism to change the angle of the image sensor to the degree determined by the first and second magnitudes of correction, thereby correcting the tilt of the subject image.

The actuator 280a is mechanically connected to the image sensor 140, and the controller 280b changes the angle of the image sensor 140 by controlling the actuator 280a.

The image capturing section 270 includes a lens barrel to which the image sensor 140 is secured. The actuator 280a is mechanically connected to the lens barrel. The controller 280b changes the angle of the image sensor 140 by getting the angle of the lens barrel changed by the actuator 280a.

Other Embodiments

The adder 350 shown in FIG. 5 is not an indispensable component.

Figure 8:
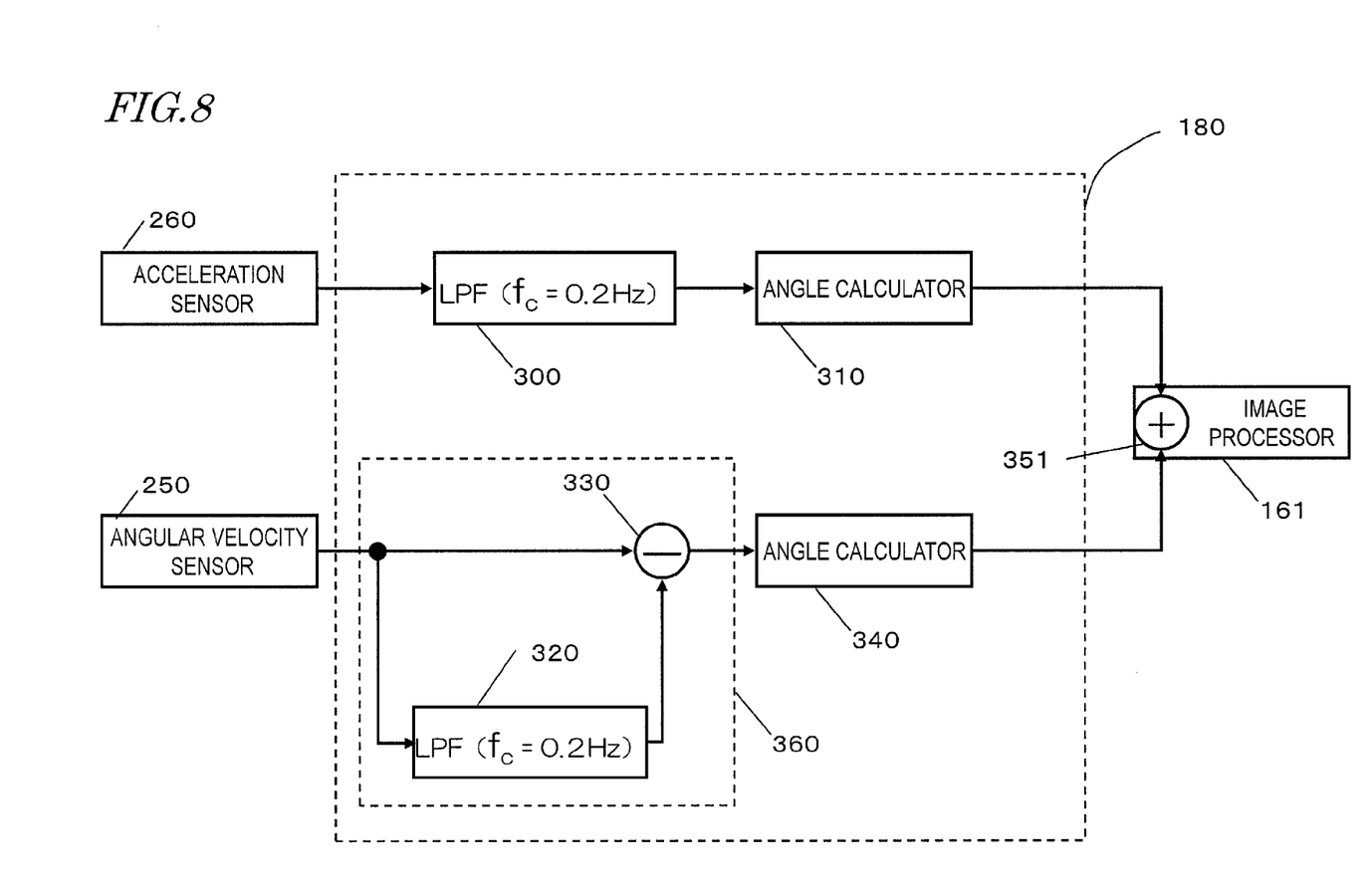
FIG. 8 illustrates a configuration for a controller 180 with no adders 350.

An exemplary configuration for a controller 180 with no adders 350 is shown in FIG. 8. In this configuration, not the controller 180 but the image processor 161 includes an adder 351. But other than that, the image processor 161 has the same configuration as the image processor 160. The angle calculators 310 and 340 respectively output information about the angle of dynamic rotation calculated and information about the angle of static rotation calculated to the image processor 161. In response, the image processor 161 receives these pieces of information and gets them added together by the adder 351, thereby calculating the angle of rotation correction.

Although an angular velocity sensor is supposed to be used in the embodiment described above, an angular acceleration sensor may also be used instead. By calculating the integral of the angular acceleration values that have been detected by the angular acceleration sensor, the angular velocity can also be obtained and the same processing as what has already been described for the embodiment is also applicable.

Also, in the embodiment described above, a rotation correction on an image that has been shot with the digital camcorder is supposed to be carried out by getting tilt correction processing done by the image processor 160. However, this is only an example. Alternatively, the rotation correction on an image that has been shot with the digital camcorder may also be carried out by rotating the CMOS image sensor 140 by reference to information about the angle γ of rotation correction calculated. In this case, the CMOS image sensor 140 may be rotated either by itself or with the optical system 110 on a lens barrel basis.

Figure 9:
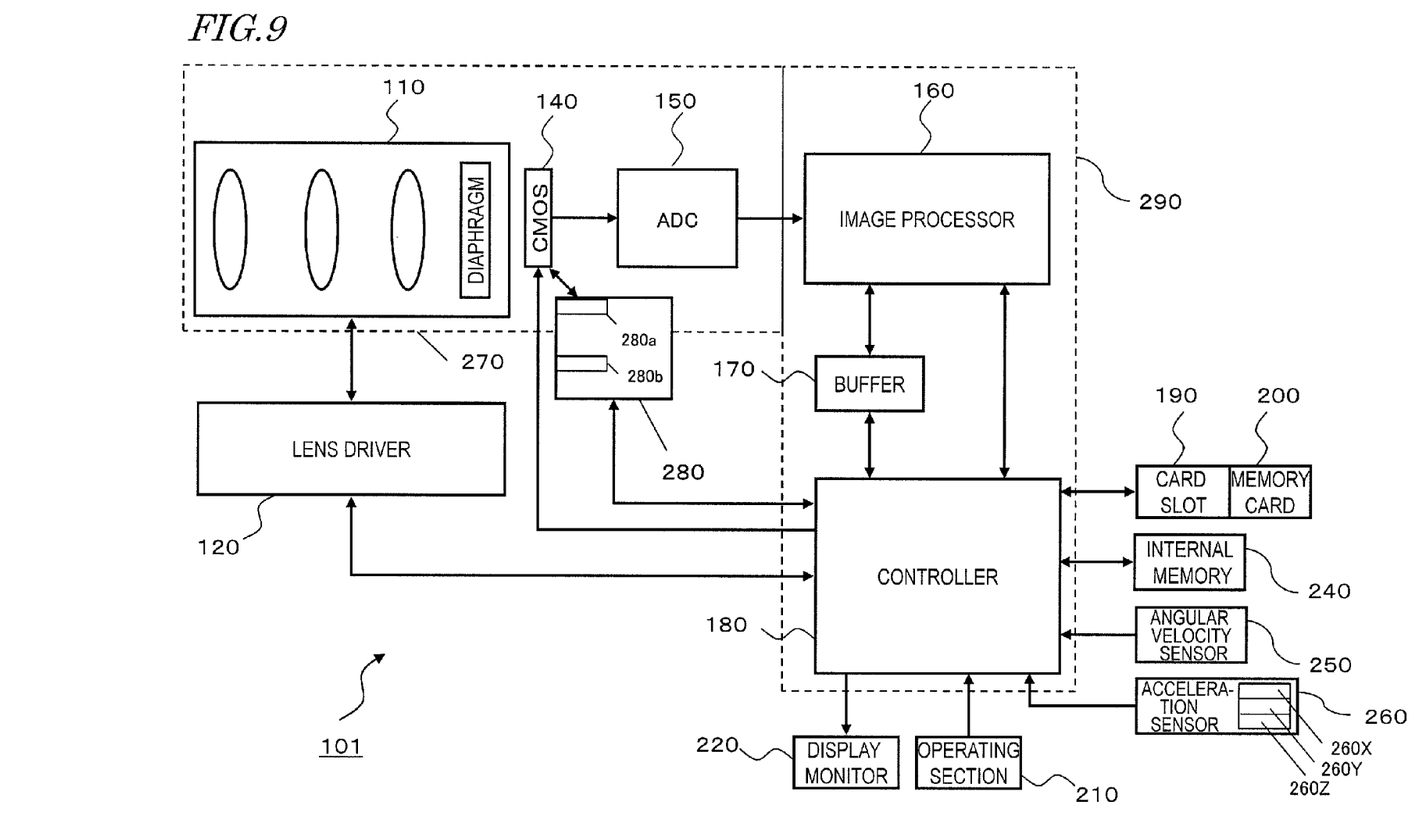
FIG. 9 is a block diagram illustrating a configuration for a digital camcorder 101 which corrects the tilt of a subject image.

FIG. 9 illustrates a digital camcorder 101 including a sensor driving mechanism 280. In terms of hardware, the only difference between this digital camcorder 101 and the digital camcorder 100 shown in FIG. 2 is whether the sensor driving mechanism 280 is provided or not. Meanwhile, in terms of software, the image processor 160 of this digital camcorder 101 does not need to perform the image tilt correction processing. Thus, the following description will be focused on only the sensor driving mechanism 280. Also, in the following description, the sensor driving mechanism 280 is supposed to rotate the CMOS image sensor 140 by itself.

The sensor driving mechanism 280 changes the angle defined by the CMOS image sensor 140 within a plane that intersects with the optical axis at right angles. To perform such an operation, the sensor driving mechanism 280 may include an actuator 280a which is physically connected to the CMOS image sensor 140 and a controller 280b which controls the actuator 280a, for example.

The controller 180 performs the processing of calculating the angle γ of rotation correction just as described above. Specifically, by reference to information about the angle γ of rotation correction calculated, the controller 180 instructs the sensor driving mechanism 280 to rotate and drive the CMOS image sensor 140. If the digital camcorder 100 has been tilted by the angle γ counterclockwise as shown in FIG. 6, then the sensor driving mechanism 280 may move the CMOS image sensor 140 by the angle γ clockwise. As a result, the tilt of the subject image formed on the CMOS image sensor 140 can be corrected. Consequently, an image shot, of which the tilt has been either reduced or canceled, can be obtained.

In the foregoing description, the sensor driving mechanism 280 is supposed to rotate the CMOS image sensor 140 by itself. However, in an embodiment in which the lens barrel is supposed to be rotated, the actuator 280a may be mechanically connected to either the lens barrel or the image capturing section 270. Nevertheless, an actuator to drive the CMOS image sensor 140 and an actuator to drive the lens barrel may have mutually different specifications. In any case, a person with ordinary skills would adopt appropriate actuators for them, though. Since the CMOS image sensor 140 is fixed inside the lens barrel, the angle defined by the CMOS image sensor 140 is changed by making the actuator 280a rotate the lens barrel. The direction of rotation can be just as described above.

The image processor 160 or the processor 290 described above can perform either the processing of correcting the tilt of the subject image formed on the CMOS image sensor 140 by the optical system 110 or the processing of correcting the tilt of the image that has been captured. As a result, the digital camcorder 100 can generate an image, of which the tilt has been corrected.

In the embodiment described above, the digital camcorder is supposed to make a rotation correction on the image shot. However, this is only an example. Optionally, the angles calculated may also be applied to the display of an electronic leveling instrument.

The present disclosure can be used in not only digital camcorders but also digital cameras, cellphones with camera, smart phones with camera, and various other kinds of electronic devices.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2013-010994 filed on Jan. 24, 2013, the entire contents of which are hereby incorporated by reference.

What is claimed is:

1. An image capture device, comprising:
  an image capturing section configured to generate an image based on a subject image that has been formed;
  a first sensor configured to detect acceleration of gravity on the image capture device itself and configured to output a result of the detection as a first detection signal;
  a second sensor configured to detect a variation in the image capture device's own attitude and configured to output a result of the detection as a second detection signal; and
  a processor configured to calculate a first magnitude of correction based on a frequency component that is included in the first detection signal and that is equal to or lower than a first predetermined frequency, configured to calculate a second magnitude of correction based on a frequency component that is included in the second detection signal and that is equal to or higher than a second predetermined frequency, and configured to correct, based on the calculated first and second magnitudes of correction, tilt of at least one of the subject image and the image.

2. The image capture device of claim 1, wherein the first sensor is an acceleration sensor and the second sensor is one of an angular velocity sensor and an angular acceleration sensor.

3. The image capture device of claim 1, wherein the processor calculates the first magnitude of correction based on a part of the frequency component of the first detection signal that has passed through a low-pass filter, of which the cutoff frequency is defined by the first frequency, and
  wherein the processor calculates the second magnitude of correction based on a part of the frequency component of the second detection signal that has passed through a high-pass filter, of which the cutoff frequency is defined by the second frequency.

4. The image capture device of claim 3, wherein a gain characteristic of the low-pass filter with respect to frequencies that are equal to or lower than its own cutoff frequency and a gain characteristic of the high-pass filter with respect to frequencies that are equal to or higher than its own cutoff frequency fall within a predetermined range.

5. The image capture device of claim 4, wherein the gain characteristic of the low-pass filter with respect to the frequencies that are equal to or lower than its own cutoff frequency and the gain characteristic of the high-pass filter with respect to the frequencies that are equal to or higher than its own cutoff frequency are substantially flat.

6. The image capture device of claim 4, wherein the respective cutoff frequencies of the low-pass filter and the high-pass filter are substantially equal to each other.

7. The image capture device of claim 3, wherein the high-pass filter includes a filter having the same frequency characteristic and same gain characteristic as the low-pass filter and a subtractor, and
  wherein the filter filters the second detection signal to pass low-frequency components of the second detection signal, and
  wherein the subtractor subtracts the signal that has been filtered by the filter from the second detection signal and outputs high-frequency components of the second detection signal.

8. The image capture device of claim 1, wherein the processor includes an image processor which corrects the tilt of the image that has been generated by the image capturing section based on a first magnitude of correction that has been calculated using frequency components of the first detection signal that are equal to or lower than a first predetermined frequency and on a second magnitude of correction that has been calculated using frequency components of the second detection signal that are equal to or higher than a second predetermined frequency.

9. The image capture device of claim 1, wherein the processor includes:
  a controller which calculates a first magnitude of correction based on frequency components of the first detection signal that are equal to or lower than a first predetermined frequency and calculates a second magnitude of correction based on frequency components of the second detection signal that are equal to or higher than a second predetermined frequency; and
  an image processor which corrects, based on the calculated first and second magnitudes of correction, the tilt of the image that has been generated by the image capturing section.

10. The image capture device of claim 1, wherein the image capturing section includes an image sensor which forms the subject image, and wherein the image capture device further includes a driving mechanism configured to change the angle of the image sensor, and wherein the driving mechanism includes:

an actuator which changes the angle of the image sensor; and a controller which controls the actuator so that the actuator changes the angle of the image sensor in accordance with an instruction given by the processor, and wherein the processor instructs the driving mechanism to change the angle of the image sensor to the degree determined by the calculated first and second magnitudes of correction, thereby correcting the tilt of the subject image.

11. The image capture device of claim 10, wherein the actuator is mechanically connected to the image sensor, and wherein the controller changes the angle of the image sensor by controlling the actuator.

12. The image capture device of claim 10, wherein the image capturing section includes a lens barrel to which the image sensor is secured, and wherein the actuator is mechanically connected to the lens barrel, and wherein the controller changes the angle of the image sensor by getting the angle of the lens barrel changed by the actuator.

* * * * *